United States Patent [19]

Stevenson

[11] Patent Number: 5,588,713
[45] Date of Patent: Dec. 31, 1996

[54] PROCESS FOR MAKING SODIUM BICARBONATE FROM NAHCOLITE-RICH SOLUTIONS

[76] Inventor: Tom D. Stevenson, 2413 Pelham Dr., Houston, Tex. 77019

[21] Appl. No.: 575,883

[22] Filed: Dec. 20, 1995

[51] Int. Cl.$^6$ .................... E21B 43/28; E21C 41/20; C01D 7/10
[52] U.S. Cl. .................................. 299/5; 423/422
[58] Field of Search .................... 166/303; 299/4, 299/5; 423/189, 206.2, 422

[56] References Cited

U.S. PATENT DOCUMENTS

| | | | |
|---|---|---|---|
| 1,865,833 | 7/1932 | Chesny | 423/422 X |
| 3,759,328 | 9/1973 | Euber et al. | 166/303 |
| 3,759,574 | 9/1973 | Beard | 299/4 |
| 3,779,602 | 12/1973 | Beard et al. | 299/5 |
| 3,780,160 | 12/1973 | Waggener et al. | 423/189 X |
| 3,792,902 | 2/1974 | Towell et al. | 299/5 |
| 3,868,444 | 2/1975 | Frevel et al. | 423/422 |
| 4,291,002 | 9/1981 | Arnold et al. | 423/189 |
| 4,375,302 | 3/1983 | Kalmar | 299/4 |
| 4,498,706 | 2/1985 | Ilardi et al. | 299/5 |
| 4,815,790 | 3/1989 | Rosar et al. | 299/4 |
| 5,275,794 | 1/1994 | Luna | 423/422 X |

*Primary Examiner*—George A. Suchfield
*Attorney, Agent, or Firm*—Kenneth A. Roddy

[57] ABSTRACT

A process for making sodium bicarbonate from Nahcolite-rich solutions utilizes solubility suppression with addition of salt. Hot water pumped into a Nahcolite-rich formation, which may contain salt (NaCl) and other impurities in excess of 6% by weight, dissolves the Nahcolite ($NaHCO_3$) and salt. The dissolved Nahcolite is brought to the surface as a pregnant brine liquor containing Nahcolite, salt, and other impurities, which is then de-gassed under pressure. The pregnant liquor is then mixed with a salt slurry and its temperature reduced to saturate it with salt and force precipitation of Nahcolite out of the pregnant liquor. Carbon dioxide ($CO_2$) is injected while mixing the pregnant liquor with the salt to facilitate precipitation and conversion of any sodium carbonate ($Na_2C_3$) present into sodium bicarbonate ($NaHCO_3$). The sodium bicarbonate ($NaHCO_3$) is dewatered and filtered to form a sodium bicarbonate ($NaHCO_3$) filter cake, which is washed with fresh cold water to remove salt (NaCl), sodium carbonate ($Na_2CO_3$), and other impurities as a salt-rich brine filtrate, and the filter cake is dried to produce a high grade of natural sodium bicarbonate ($NaHCO_3$). The filtrate may be processed to produce hot water condensate which can then be used to dissolve the Nahcolite, and the salt slurry produced can be used to saturate the pregnant liquor and force Nahcolite precipitation, and a portion may be dried and used as a saleable by-product.

12 Claims, 2 Drawing Sheets

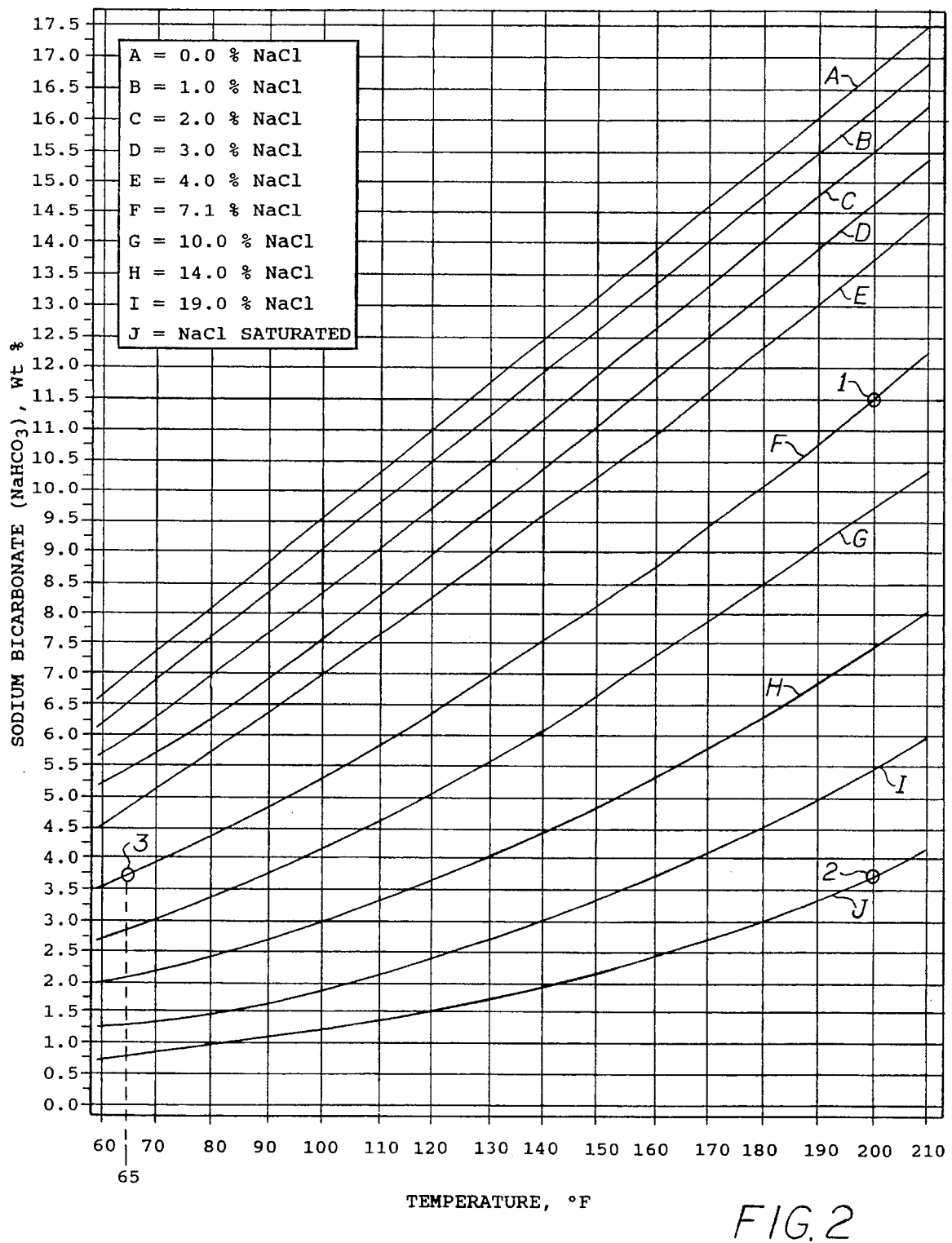

5,588,713

PROCESS FOR MAKING SODIUM BICARBONATE FROM NAHCOLITE-RICH SOLUTIONS

BACKGROUND OF THE INVENTION

1. Field of the Invention

This invention relates generally to processes for making sodium bicarbonate, and more particularly to a process for making sodium bicarbonate from Nahcolite-rich solutions by use of solubility suppression with addition of salt.

2. Brief Description of the Prior Art

Sodium bicarbonate ($NaHCO_3$) is an important industrial chemical used in water and air pollution control, various industrial processes, as a fire extinguisher and in higher grades as an antacid, an agricultural feed additive, and as a baking powder and component of foods.

Typically, there are three processes which are used to produce or recover sodium bicarbonate: (1) the carbonization of naturally or synthetically produced sodium carbonate solutions; (2) crystalization of a naturally occurring or by-product sodium bicarbonate solution; or (3) carbonization of ammonium carbonate and reacting with sodium chloride.

In the process of carbonization of naturally produced sodium carbonate solutions, the sodium carbonate solution is usually a saturated brine solution containing a variety of sodium salts. The solubility of sodium bicarbonate is greatly depressed by the presence of sodium chloride, sodium sulfate or other salts.

There are several patents which disclose various processes for producing or recovering sodium bicarbonate.

Ueber et al, U.S. Pat. No. 3,759,328 discloses a process for recovering oil shale wherein hot water or steam is injected into the bore hole in an oil shale formation to expand the cavity and permeabilize and rubble the oil shale rock for recovery of shale oil through pyrolysis of the kerogen contained in the oil shale. Pressure is maintained above the decomposition pressure of the carbonate minerals (trona and Nahcolite) such that the minerals decompose and shale oil is recovered.

Beard et al, U.S. Pat. No. 3,779,602 discloses a pressure/temperature dependent process for solution mining sodium bicarbonate minerals from an oil shale formation in a Nahcolite zone by injecting steam at the top of a steam filled cavity at a temperature in excess of 250° F., and maintaining the cavity temperature greater than 250° F. to maximize cavity growth rate. Condensation of steam to a liquid form occurs upon contact with the formation and results in collection of superheated water in the lower portion of the cavity. The pressure is maintained at a pressure at which the sodium-carrying capacity of the superheated water is at a maximum and below which there will be excess thermal decomposition of bicarbonate to carbonate and precipitation of carbonate.

Towell et al, U.S. Pat. No. 3,792,902 discloses a process for solution mining of trona or Nahcolite wherein hot water of low alkalinity is injected into the base of a production tubing string or adjacent the intake to prevent mineral precipitation and plugging of the production well by dilution. The process utilizes hot water or steam (325° F.) and a pressure of 1500 psi to produce a mixed $Na_2CO_3/NaHCO_3$-rich production solution.

Beard, U.S. Pat. No. 3,759,574 discloses a process for producing oil shale from a trona and/or Nahcolite formation which includes initial permeabilization of the formation by the dissolution of the sodium minerals with a hot aqueous solution.

Kelmar, U.S. Pat. No. 4,375,302 discloses a process for recovering multi-minerals from oil shale wherein a NaOH solution is injected into the oil shale to dissolve $NaHCO_3$ and convert it to an $Na_2CO_3$ solution in order to develop porosity in the oil shale in preparation for recovery of shale oil.

Rosar et al, U.S. Pat. No. 4,815,790 discloses a Nahcolite solution mining process wherein a hot barren aqueous liquor at a temperature of from about 85° F. to about 300° F. is injected at a pressure of below about 150 psig and circulated in a cavity in a Nahcolite ($NaHCO_3$) bed for a time sufficient to produce a pregnant liquor having an increase in the concentration of $NaHCO_3$ in the range of from about 3% to about 20% while maintaining sodium carbonate ($Na_2CO_3$) concentration in the range of 0.25% to 4% (preferably less than 2.5%). The pregnant liquor is withdrawn and cooled to about 25° F. to 120° F. to precipitate the sodium bicarbonate ($NaHCO_3$) by crystalization and to produce a barren liquor which may be reheated and reinjected.

The cooling/crystalization process taught by Rosar et al is greatly influenced by the presence of impurities such as sodium carbonate ($Na_2CO_3$) and salt (NaCl) and requires that the salt (NaCl) concentration be maintained at below about 6% (preferably below about 1.0%).

The present invention is distinguished over the prior art in general, and these patents in particular by a process for making sodium bicarbonate from Nahcolite-rich solutions which utilizes solubility suppression with addition of salt. Hot water pumped into a Nahcolite-rich formation, which may contain salt (NaCl) and other impurities in excess of 6% by weight, dissolves the Nahcolite ($NaHCO_3$) and salt. The dissolved Nahcolite is brought to the surface as a pregnant brine liquor containing Nahcolite, salt, and other impurities, which is then de-gassed under pressure. The pregnant liquor is then mixed with a salt slurry and its temperature reduced to saturate it with salt and force precipitation of Nahcolite out of the pregnant liquor. Carbon dioxide ($CO_2$) is injected while mixing the pregnant liquor with the salt to facilitate precipitation and conversion of any sodium carbonate ($Na_2CO_3$) present into sodium bicarbonate ($NaHCO_3$). The sodium bicarbonate ($NaHCO_3$) is dewatered and filtered to form a sodium bicarbonate ($NaHCO_3$) filter cake, which is washed with fresh cold water to remove salt (NaCl), sodium carbonate ($Na_2CO_3$), and other impurities as a salt-rich brine filtrate, and the filter cake is dried to produce a high grade of natural sodium bicarbonate ($NaHCO_3$). The filtrate may be processed to produce hot water condensate which can then be used to dissolve the Nahcolite, and the salt slurry produced can be used to saturate the pregnant liquor and force Nahcolite precipitation, and a portion may be dried and used as a saleable by-product.

It should be noted that in the process in accordance with the present invention, the presence of salt will not be deleterious to the processing of the pregnant liquor for recovery of the sodium bicarbonate and is not influenced by the purity of the pregnant liquor and can be used to recover Nahcolite from salt contaminated formations or surface processing facilities where the pregnant liquor contains salt in excess of 6%.

SUMMARY OF THE INVENTION

It is therefore an object of the present invention to provide a process for making sodium bicarbonate from Nahcoliterich solutions by use of solubility suppression with addition of salt.

It is another object of this invention to provide a process for making sodium bicarbonate from Nahcolite-rich solutions which conserves water by utilizing minimal quantities of water in the process.

Another object of this invention is to provide a process for making sodium bicarbonate from Nahcolite-rich solutions which conserves energy by recycling hot condensate produced in the process for use in the initial step of dissolving Nahcolite from the formation.

Another object of this invention is to provide a process for making sodium bicarbonate from Nahcolite-rich solutions which is not influenced by the purity of the pregnant liquor.

Another object of this invention is to provide a process for making sodium bicarbonate from Nahcolite-rich solutions which can be used to recover Nahcolite from salt contaminated formations or surface processing facilities where the pregnant liquor contains salt in excess of 6%.

A further object of this invention is to provide a process for making sodium bicarbonate from Nahcolite-rich solutions which produces salt (NaCl) as a saleable by-product and eliminates the need for large surface containment areas for collection of purge liquors.

A still further object of this invention is to provide a process for making pure sodium bicarbonate from Nahcolite-rich solutions which is highly efficient and cost effective Other objects of the invention will become apparent from time to time throughout the specification and claims as hereinafter related.

The above noted objects and other objects of the invention are accomplished by a process for making sodium bicarbonate from Nahcolite-rich solutions which utilizes solubility suppression with addition of salt. Hot water pumped into a Nahcolite-rich formation, which may contain salt (NaCl) and other impurities in excess of 6% by weight, dissolves the Nahcolite ($NaHCO_3$) and salt. The dissolved Nahcolite is brought to the surface as a pregnant brine liquor containing Nahcolite, salt, and other impurities, which is then de-gassed under pressure. The pregnant liquor is then mixed with a salt slurry and its temperature reduced to saturate it with salt and force precipitation of Nahcolite out of the pregnant liquor. Carbon dioxide ($CO_2$) is injected while mixing the pregnant liquor with the salt to facilitate precipitation and conversion of any sodium carbonate ($Na_2CO_3$) present into sodium bicarbonate ($NaHCO_3$). The sodium bicarbonate ($NaHCO_3$) is dewatered and filtered to form a sodium bicarbonate ($NaHCO_3$) filter cake, which is washed with fresh cold water to remove salt (NaCl), sodium carbonate ($Na_2CO_3$), and other impurities as a salt-rich brine filtrate, and the filter cake is dried to produce a high grade of natural sodium bicarbonate ($NaHCO_3$). The filtrate may be processed to produce hot water condensate which can then be used to dissolve the Nahcolite, and the salt slurry produced can be used to saturate the pregnant liquor and force Nahcolite precipitation, and a portion may be dried and used as a saleable by-product.

BRIEF DESCRIPTION OF THE DRAWINGS

FIG. 2 is a graph showing solubility of various mixes of sodium bicarbonate ($NaHCO_3$) and salt (NaCl) at various temperatures in degrees F.

DESCRIPTION OF THE PREFERRED EMBODIMENT

Figure 1:
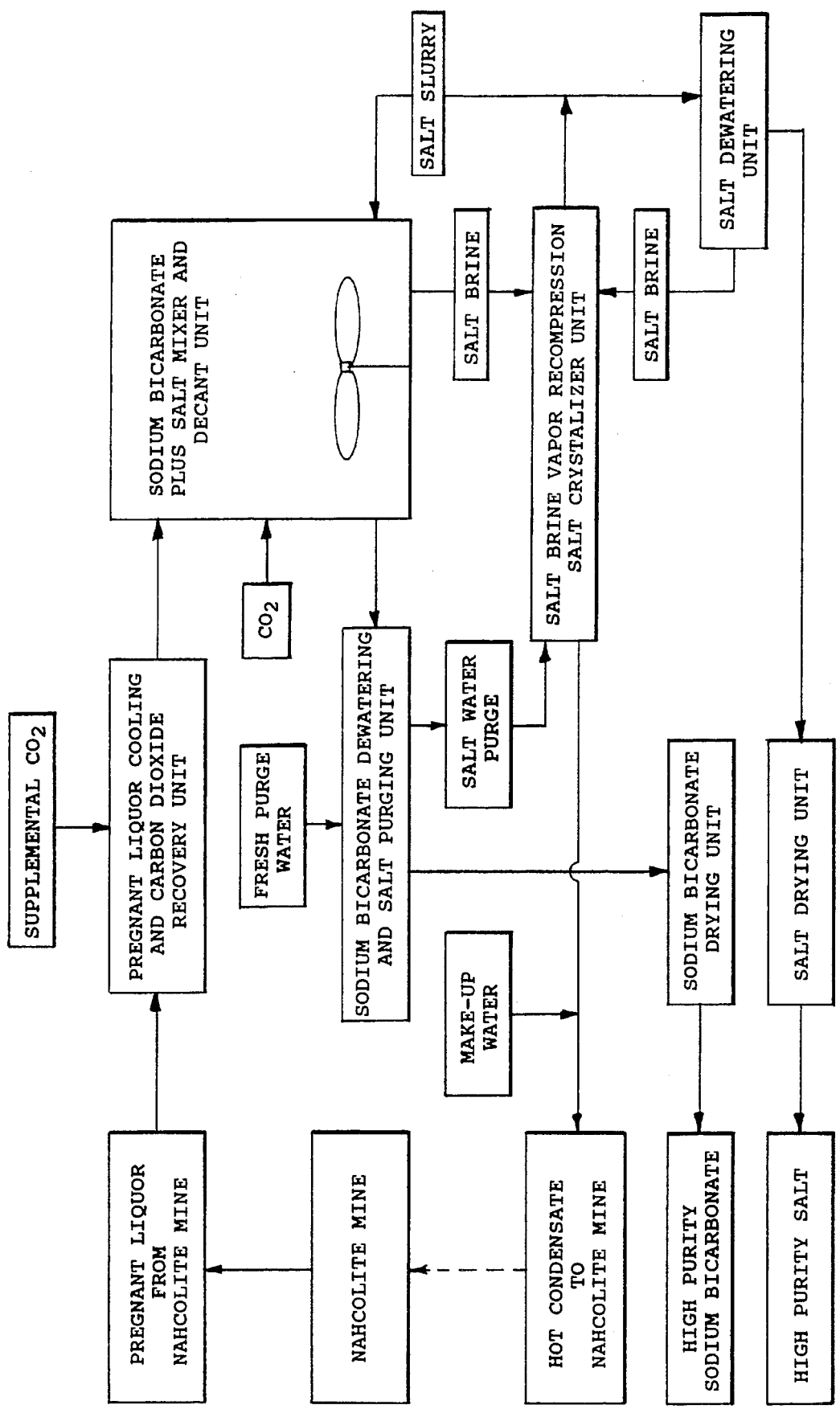
FIG. 1 is a schematic flow diagram illustrating the process for making sodium bicarbonate from Nahcolite-rich solutions in accordance with the present invention.

Referring to the drawings by numerals of reference, there is shown schematically in FIG. 1, a preferred process for making sodium bicarbonate ($NaHCO_3$) from Nahcolite-rich solutions by use of solubility suppression with addition of salt (NaCl) in accordance with the present invention. The process is characterized by the following steps:

(a) Hot water ($H_2O$) in the temperature range of from about 160° F. to about 230° F. is pumped at a pressure of about 150 psig into an underground Nahcolite ($NaHCO_3$)-rich formation, which may contain salt (NaCl) and other impurities in excess of 6% by weight, to dissolve the Nahcolite ($NaHCO_3$) and salt;

(b) The dissolved Nahcolite ($NaHCO_3$) is brought to the surface of the formation in the form of a saturated brine pregnant liquor solution containing Nahcolite and may also contain salt (NaCl) and other impurities in excess of 6% by weight;

(c) The pregnant liquor solution is de-gassed under a pressure in the range of from about 100 psig to about 30 psig in a pressure controlled system;

(d) The de-gassed pregnant liquor solution is mixed with a salt (NaCl) slurry which may typically contain about 90% or more NaCl, by weight of total salts present, and the temperature of the degassed pregnant liquor solution is reduced to the range of from about 200° F. to about 160° F., which is sufficient to saturate the degassed pregnant liquor solution with salt (NaCl) and to force precipitation of Nahcolite ($NaHCO_3$) out of the degassed pregnant liquor solution;

(e) While mixing the de-gassed pregnant liquor solution with the salt (NaCl), carbon dioxide ($CO_2$) is injected into the mixture to facilitate precipitation and conversion of any sodium carbonate ($Na_2CO_3$) present into sodium bicarbonate ($NaHCO_3$);

(f) The sodium bicarbonate ($NaHCO_3$) is dewatered and filtered, using a combination of hydrocyclones and a vacuum filter or centrifuge, to form a sodium bicarbonate ($NaHCO_3$) filter cake, and the filter cake is washed with fresh cold water to remove salt (NaCl), sodium carbonate ($Na_2CO_3$), and other impurities as a salt-rich brine filtrate; and thereafter (g) The washed sodium bicarbonate ($NaHCO_3$) filter cake is dried to produce a high grade of natural sodium bicarbonate ($NaHCO_3$).

To facilitate the process of de-gassing the pregnant liquor solution and forcing precipitation of Nahcolite ($NaHCO_3$), the pregnant liquor solution under pressure in the pressured controlled system at step (c) may also be cooled at this step to a temperature in the range of from about 160° F. to about 70° F. prior to mixing it with the salt (NaCl) slurry, and then further reduced to a temperature in the range of from about 70° F. to about 50° F. as it is mixed with the salt (NaCl) slurry at step (d).

The efficiency and cost effectiveness of the present process is improved by processing the salt-rich brine filtrate containing salt (NaCl), sodium carbonate ($Na_2CO_3$), and other impurities, which was removed during the washing step (f), using mechanical recompression crystalization, multiple effect crystalization, or waste heat from a co-generation plant to produce a hot condensate of water ($H_2O$) and a salt (NaCl) slurry. The hot condensate of water ($H_2O$) can then be pumped into the underground Nahcolite ($NaHCO_3$)-rich formation and used to dissolve the Nahcolite (NaHCO$_3$), in which case the hot water used for dissolving would initially contain less than about 1.0% contaminates by weight, or it may be mixed with make-up water in which case it may contain salt and other impurities in excess of 1.0%. A portion of the salt (NaCl) slurry produced can be used for mixing with the de-gassed pregnant liquor solution to saturate the de-gassed pregnant liquor solution and to force precipitation of Nahcolite (NaHCO$_3$) out of the de-gassed pregnant liquor solution in step (d). Another portion of the salt (NaCl) slurry may be dewatered and dried and used as a saleable by-product.

Supplemental carbon dioxide (CO$_2$) may also be injected into the pregnant liquor solution during de-gassing at step (c) to facilitate production of sodium bicarbonate (NaHCO$_3$) from excess sodium carbonate (Na$_2$CO$_3$).

FIG. 2 is a graph showing solubility of various mixes of sodium bicarbonate (NaHCO$_3$) and salt (NaCl) at various temperatures in degrees F. The various mixes are indicated by the line curves labeled A through J. As described previously, in the present process hot water (H$_2$O) in the temperature range of from about 160° F. to about 230° F. is pumped into the Nahcolite (NaHCO$_3$)-rich formation, which may contain salt (NaCl) and other impurities in excess of 6% by weight to dissolve the Nahcolite (NaHCO$_3$) and salt. The dissolved Nahcolite (NaHCO$_3$) is brought to the surface in the form of a saturated brine pregnant liquor solution containing Nahcolite and may contain salt (NaCl) and other impurities in excess of 6% by weight.

Referring to point 1 on the chart of FIG. 2, line curve F represents solubility using a feed liquor at 190° F. with 7.1% salt (NaCl). It can be seen that the pregnant liquor coming from the mine would contain about 7.1% salt (NaCl) and about 11.5% sodium bicarbonate (NaHCO$_3$) when reaching a temperature of about 200° F.

Adding salt drives the curve from F to J. Line curve J represents solubility using a feed liquor at 190° F. which is completely saturated with salt (NaCl). As shown at point 2 on line curve J, it can be seen that the added salt forces precipitation of the sodium bicarbonate (NaHCO$_3$) such that the pregnant liquor contains only about 3.75% sodium bicarbonate (NaHCO$_3$).

Having forced the precipitation of sodium bicarbonate (NaHCO$_3$), when the liquor is cooled to a temperature of about 65° F., it causes the remaining sodium bicarbonate (NaHCO$_3$) to precipitate, as indicated at point 3 on the chart of FIG. 2.

Thus, it can be seen that in the present process which utilizes solubility suppression with addition of salt, the presence of salt will not be deleterious to the processing of the pregnant liquor for recovery of the sodium bicarbonate and is not influenced by the purity of the pregnant liquor and the process can be used to recover Nahcolite from salt contaminated formations or surface processing facilities where the pregnant liquor contains salt in excess of 6%.

While this invention has been described fully and completely with special emphasis upon a preferred embodiment, it should be understood that within the scope of the appended claims the invention may be practiced otherwise than as specifically described herein.

I claim:

1. A process for making sodium bicarbonate from Nahcolite-rich solutions by use of solubility suppression with addition of salt, comprising the steps of:

(a) pumping hot water into an underground Nahcolite (NaHCO$_3$)-rich formation to dissolve the Nahcolite (NaHCO$_3$);

(b) returning the dissolved Nahcolite (NaHCO$_3$) to the surface of the formation in the form of a saturated brine pregnant liquor solution;

(c) de-gassing the pregnant liquor solution under pressure in a pressure controlled system;

(d) mixing the de-gassed pregnant liquor solution with a salt slurry containing an amount of NaCl sufficient to saturate the de-gassed pregnant liquor solution and reducing the temperature of the de-gassed pregnant liquor solution sufficient to saturate the de-gassed pregnant liquor solution with NaCl and to force precipitation of Nahcolite (NaHCO$_3$) out of the de-gassed pregnant liquor solution;

(e) while mixing the de-gassed pregnant liquor solution with said salt slurry, injecting carbon dioxide (CO$_2$) into the mixture to facilitate precipitation and conversion of any sodium carbonate (Na$_2$CO$_3$) present into sodium bicarbonate (NaHCO$_3$);

(f) dewatering and filtering the sodium bicarbonate (NaHCO$_3$) to form a sodium bicarbonate (NaHCO$_3$) filter cake, and washing the filter cake with fresh water to remove NaCl, sodium carbonate (Na$_2$CO$_3$), and other impurities as a salt-rich brine filtrate; and (g) drying the washed sodium bicarbonate (NaHCO$_3$) filter cake to produce a high grade of natural sodium bicarbonate (NaHCO$_3$).

2. The process according to claim 1 wherein said step of de-gassing the pregnant liquor solution under pressure in a pressure controlled system includes cooling the pregnant liquor solution at a first temperature to facilitate the de-gassing process; and said step of mixing the de-gassed pregnant liquor solution with said salt slurry and reducing the temperature of the de-gassed pregnant liquor solution is carried out at a relatively lower temperature than said first temperature.

3. The process according to claim 1 wherein said step of de-gassing the pregnant liquor solution under pressure in a pressure controlled system includes cooling the pregnant liquor solution at a temperature in the range of from about 200° F. to about 160° F. to facilitate the de-gassing process; and said step of mixing the de-gassed pregnant liquor solution with said salt slurry and reducing the temperature of the de-gassed pregnant liquor solution is carried out at a temperature in the range of from about 160° F. to about 50° F.

4. The process according to claim 1 wherein said step of de-gassing the pregnant liquor solution under pressure in a pressure controlled system includes injecting carbon dioxide (CO$_2$) into the pregnant liquor solution to facilitate the de-gassing process and conversion of sodium carbonate (Na$_2$CO$_3$) to sodium bicarbonate (NaHCO$_3$).

5. The process according to claim 1 wherein said step of dewatering and filtering the sodium bicarbonate (NaHCO$_3$) to form a sodium bicarbonate (NaHCO$_3$) filter cake is carried out by a process selected from the group consisting of hydrocycloning, vacuum filtering, and centrifuging.

6. The process according to claim 1 wherein said step of washing the filter cake with fresh water is carried out with cold wash water.

7. The process according to claim 1 comprising the further step of processing the removed salt-rich brine filtrate to produce a hot condensate of water (H$_2$O) and a salt slurry containing a substantial amount of NaCl.

8. The process according to claim 7 comprising the further step of pumping at least a portion of the produced hot condensate of water ($H_2O$) into said underground Nahcolite ($NaHCO_3$)-rich formation to dissolve the Nahcolite ($NaHCO_3$).

9. The process according to claim 7 comprising the further step of mixing at least a portion of the produced salt slurry containing a substantial amount of NaCl with the de-gassed pregnant liquor solution to carry out step (d).

10. The process according to claim 7 comprising the further steps of dewatering and drying at least a portion of the produced salt slurry containing a substantial amount of NaCl and using it as a saleable by-product.

11. The process according to claim 7 wherein said step of processing said removed salt-rich brine filtrate to produce a hot condensate of $H_2O$ and a salt slurry containing a substantial amount of NaCl is carried out by a process selected from the group consisting of mechanical recompression crystalization, multiple effect crystalization, and exposure to waste heat.

12. The process according to claim 1 wherein said hot water is pumped into said Nahcolite ($NaHCO_3$)-rich formation at a temperature of from about 230° F. to about 200° F. and at a pressure of about 150 psig to dissolve the Nahcolite ($NaHCO_3$).

* * * * *